United States Patent
Ji et al.

(10) Patent No.: US 9,828,104 B2
(45) Date of Patent: Nov. 28, 2017

(54) MOTOR BRACKET FOR MULTICOPTER FLYING ROBOT

(71) Applicant: By Robot Co., Ltd., Suwon-si (KR)

(72) Inventors: Sang Ki Ji, Anseong-si (KR); Se Hwa Hong, Anyang-si (KR)

(73) Assignee: BY ROBOT CO., LTD., Suwon-si (KR)

( * ) Notice: Subject to any disclaimer, the term of this patent is extended or adjusted under 35 U.S.C. 154(b) by 145 days.

(21) Appl. No.: 14/901,102

(22) PCT Filed: May 13, 2014

(86) PCT No.: PCT/KR2014/004257
§ 371 (c)(1),
(2) Date: Dec. 28, 2015

(87) PCT Pub. No.: WO2015/005574
PCT Pub. Date: Jan. 15, 2015

(65) Prior Publication Data
US 2016/0137306 A1    May 19, 2016

(30) Foreign Application Priority Data
Jul. 9, 2013  (KR) .......................... 10-2013-0080105

(51) Int. Cl.
*B64D 27/00* (2006.01)
*B64D 27/26* (2006.01)
(Continued)

(52) U.S. Cl.
CPC ............. *B64D 27/26* (2013.01); *A63H 27/12* (2013.01); *B64C 27/08* (2013.01); *B64C 39/024* (2013.01);
(Continued)

(58) Field of Classification Search
CPC .. B64D 27/08; B64D 27/26; B64D 2027/262; B64C 2201/027; B64C 2201/04; B64C 2201/042; B64C 2201/108
See application file for complete search history.

(56) References Cited

U.S. PATENT DOCUMENTS

| 8,026,644 | B2 * | 9/2011 | Violett | A63H 27/02 310/58 |
| 8,310,117 | B2 * | 11/2012 | Violett | A63H 27/02 310/58 |
| 2013/0287577 | A1 * | 10/2013 | Lin | B64C 11/04 416/210 R |

FOREIGN PATENT DOCUMENTS

| JP | 2009-011106 | 1/2009 |
| JP | 2010-215233 | 9/2010 |

(Continued)

OTHER PUBLICATIONS

International Search Report dated Aug. 12, 2014 From the Korean Intellectual Property Office Re. Application No. PCT/KR2014/004257 and Its Translation Into English.

*Primary Examiner* — Richard G Davis
(74) *Attorney, Agent, or Firm* — Studebaker & Brackett PC

(57) ABSTRACT

Disclosed is a motor bracket of a multicopter flying robot. The motor bracket for the multicopter flying robot disclosed in the present invention includes: a body 110 receiving a rotary motor 500 therein which is used in the multicopter flying robot, a connection portion 120 which is formed on the outer surface of the body and receives two power supply lines 510 and 520 connected to a power terminal of the rotary motor 500, and a power supply member 300 which is pushed into the connection portion 120 and electrically contacts the at least two power supply lines 510 and 520. The connection portion 120 includes a spatial separation (Continued)

portion 122 which performs a function of forming separated spaces of which the number is the same as the number of the at least two power supply lines 510 and 520.

8 Claims, 1 Drawing Sheet

(51) Int. Cl.
*A63H 27/00* (2006.01)
*H01R 13/627* (2006.01)
*B64C 27/08* (2006.01)
*B64C 39/02* (2006.01)
*B64D 27/24* (2006.01)

(52) U.S. Cl.
CPC ........... *B64D 27/24* (2013.01); *H01R 13/627* (2013.01); *B64C 2201/024* (2013.01); *B64C 2201/027* (2013.01); *B64C 2201/042* (2013.01); *B64C 2201/108* (2013.01); *B64D 2027/262* (2013.01)

(56) References Cited

FOREIGN PATENT DOCUMENTS

| KR | 10-2013-0033669 | 4/2013 |
| KR | 10-1271453 | 6/2013 |
| WO | WO 2015/005574 | 1/2015 |

\* cited by examiner

MOTOR BRACKET FOR MULTICOPTER FLYING ROBOT

RELATED APPLICATIONS

This application is a National Phase of PCT Patent Application No. PCT/KR2014/004257 having International filing date of May 13, 2014, which claims the benefit of priority of Korean Patent Application No. 10-2013-0080105 filed on Jul. 9, 2013. The contents of the above applications are all incorporated by reference as if fully set forth herein in their entirety.

FIELD AND BACKGROUND OF THE INVENTION

The present invention relates to a motor fixing device, and more particularly to a motor bracket of a multicopter flying robot.

In general, a flying robot is used for a variety of purposes from military to civilian uses.

For example, dangerous forest fire devouring ridge and valley is often hard to extinguish due to the difficulty in detecting the ignition point, topography, wind direction, etc. In this case, since people cannot get into the forest fire and check the situation, the forest fire is extinguished late, and thus, damage increases rapidly. In emergency like this, an unmanned reconnaissance flying robot is able to fly immediately to the forest fire site and to capture the topology where the forest fire is caused and the path of the forest fire, etc., in the air. Also, the unmanned reconnaissance flying robot is able to transmit the captured real time images to a control center, thereby enabling to extinguish the forest fire exactly and rapidly on the basis of the images.

Furthermore, the unmanned reconnaissance flying robot is able to fly to 29 river bridges connecting the entire area of Seoul city, to check the current states, and to thoroughly examine whether there is a risk of damage or not. The unmanned reconnaissance flying robot is also able to broadcast an extreme condition that is hard to be accessed by people, for example, examination of a transmitting tower and a power line through which high-voltage current flows, search for survivors in a disaster area, etc. Most of all, the unmanned reconnaissance flying robot is the most actively combined with military uses. The unmanned reconnaissance flying robot can be implemented to be able to monitor and reconnoiter dangerous areas in a battlefield and to support shooting invisible enemies, etc.

At present, most unmanned reconnaissance flying robots which are being developed in each country of the world can take off and land vertically by using a driving force of rotor blades (propeller), fly in up, down, right and left directions, and hover stably in the air. An electric motor or gasoline engine is used to generate the driving force moving the rotor blades.

The weight and size of the unmanned reconnaissance flying robot vary according to developers thereof, and there are differences in the shapes and functions of the unmanned reconnaissance flying robots. A small portable flying robot with a weight of 1 to 3 kg has a small noise and is suitable for monitoring and reconnoitering. However, due to the limit of the size, the small flying robot has a low speed and a relatively short flight duration. Contrarily, a medium or large flying robot with a weight of over 10 kg has the maximum speed of 230 km/h and has a flight duration of about 5 hours. The flying robot generally has a shape of a helicopter having outwardly exposed rotor blades. Besides, recently, the flying robot has a duct shape concealing the rotor blades within the duct.

Also, the technical level of the foreign unmanned reconnaissance flying robot is still much superior and has an excellent flight range, speed, duration of flight, etc. While Korea is at a technical level of a prototype, a military power like the United States has already started commercializing the flying robot for military uses and is developing a portable terminal capable of checking and controlling the portable flying robot, thereby allowing a user of the terminal to monitor and reconnoiter in the air in real time while moving.

Meanwhile, an inexpensive multicopter flying robot is generally being used among the unmanned reconnaissance flying robots.

The multicopter flying robot has a shape in which a plurality of rotary motors are connected with respect to a central axis respectively and is designed such that propellers are directly mounted on the rotational axis of the rotary motor. However, there is a problem in that the multicopter flying robot is manufactured up to now by a method of directly connecting the rotary motor with a power supply.

In order to solve the problem, the present invention is designed to provide a motor bracket of the multicopter flying robot.

SUMMARY OF THE INVENTION

The object of the present invention is to provide a motor bracket of the multicopter flying robot, which is easily manufactured and maintained by causing a rotary motor and a power supply, which are provided to the multicopter flying robot, to be easily attached to or detached from each other and by causing a power connector, which is connected by using an existing wire, to supply electric power without soldering by removing the wire.

For the purpose of solving the problem, the motor bracket of the multicopter flying robot according to an embodiment of the present invention includes a body 110 receiving a rotary motor 500 therein which is used in the multicopter flying robot, a connection portion 120 which is formed on the outer surface of the body and receives two power supply lines 510 and 520 connected to a power terminal of the rotary motor 500, and a power supply member 300 which is pushed into the connection portion 120 and electrically contacts the at least two power supply lines 510 and 520. The connection portion 120 includes a spatial separation portion 122 which performs a function of forming separated spaces of which the number is the same as the number of the at least two power supply lines 510 and 520.

At least two spacing plates 121 are spaced from each other within the connection portion 120.

The at least two power supply lines 510 and 520 are pushed into the connection portion 120 along the inner surface of the body 110 in order to prevent an electrical short-circuit, and then are bent to the at least two spacing plates 121 respectively.

The power supply member 300 is a PCB which is connected to a power supply of the multicopter flying robot.

The power supply member 300 is pushed into the connection portion 120 and includes at least two connecting parts 131 which contact the at least two power supply lines 510 and 520 respectively. The at least two connecting parts 131 are spaced from each other.

The bent portions of the at least two power supply lines 510 and 520 are stripped at a certain length, and then are seated on the at least two spacing plates 121 respectively.

The spatial separation portion 122 has a structure which is divided into at least two branches depending on the use thereof.

According to the motor bracket of the multicopter flying robot according to the embodiment of the present invention, the rotary motor provided within the multicopter flying robot can be prevented from being separated away to the outside, and additionally, the power supply line of the rotary motor, which is connected directly to a power driving unit of the multicopter flying robot, can be easily connected by using the power supply member having an attachable-detachable structure.

Also, when the multicopter flying robot takes off and lands, it is possible to obtain a structure capable of mitigating the impact with the ground and of reducing the vibration of the rotary motor, so that the multicopter flying robot is able to more stably take off and land.

DESCRIPTION OF SPECIFIC EMBODIMENTS OF THE INVENTION

Figure 1:
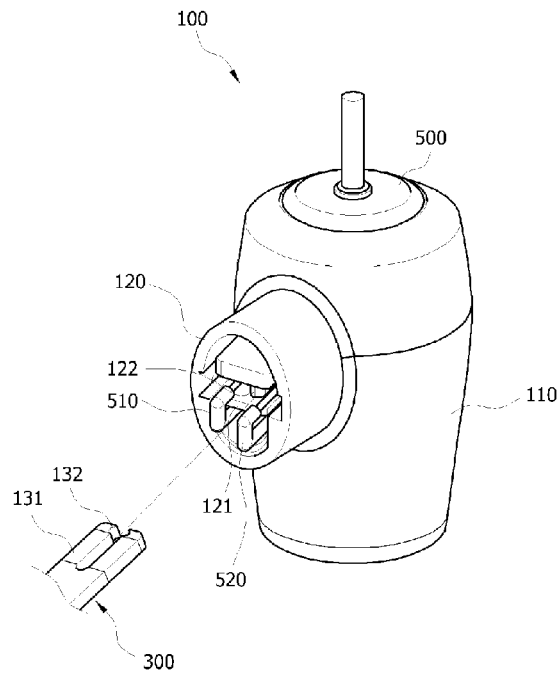
FIG. 1 is a perspective view showing a motor bracket of a multicopter flying robot, which has been coupled to a rotary motor in accordance with an embodiment of the present invention.

Hereinafter, one exemplary embodiment according to the present invention will be described with reference to the accompanying drawings. In the following description of the present invention, the detailed description of known functions and configurations incorporated herein is omitted when it may make the subject matter of the present invention rather unclear.

As the embodiment according to the concept of the present invention can have various embodiments as well as can be diversely changed, specific embodiments will be illustrated in the drawings and described in detail in the present specification. While the embodiment according to the concept of the present invention is not limited to particular embodiments, all modification, equivalents and substitutes included in the spirit and scope of the present invention are understood to be included therein. In the drawings, similar reference numerals are used to designate similar components.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. Expressions describing the relationship between the components, that is, "between ~", and "directly between ~" or "adjacent to ~" and "directly adjacent to ~" and the like should be construed in the same way.

Terms used in the present specification are provided for description of only specific embodiments of the present invention, and not intended to be limiting. An expression of a singular form includes the expression of plural form thereof unless otherwise explicitly mentioned in the context. In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics, numbers, steps, operations, components, parts or any combination thereof.

FIG. 1 is a perspective view showing a motor bracket of a multicopter flying robot, which has been coupled to a rotary motor in accordance with an embodiment of the present invention.

Figure 2:
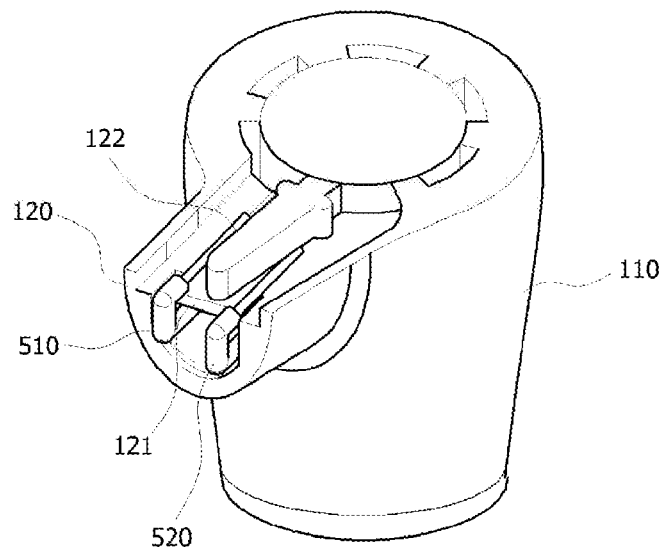
FIG. 2 is a horizontal sectional view of the motor bracket shown in FIG. 1.

FIG. 2 is a horizontal sectional view of the motor bracket shown in FIG. 1.

As shown in FIGS. 1 and 2, a motor bracket 100 according to the embodiment of the present invention includes a body 110, a connection portion 120, and a power supply member 300.

The body 110 has an upper portion thereof which is open to receive a rotary motor 500 in the body 110. The body 110 is formed to have a receiving space formed therein. Also, a damper capable of absorbing the impact with the ground may be provided on the bottom surface of the body 110.

The connection portion 120 is formed on the outer surface of the body 110 and receives at least two power supply lines 510 and 520 connected to a power terminal of the rotary motor 500. The connection portion 120 is combined with the power supply member 300 which is pushed into the connection portion 120 in one direction.

The power supply member 300 is pushed into the connection portion 120 and electrically contacts the at least two power supply lines 510 and 520.

More specifically, the connection portion 120 includes a spatial separation portion 122 which is attachable to and detachable from the power supply member 300. At least two spacing plates 121 are formed below the spatial separation portion 122 and are spaced from each other.

Here, the spatial separation portion 122 is attachable to and detachable from the power supply member 300 and forms separated spaces of which the number is the same as the number of the at least two power supply lines 510 and 520, thereby preventing an electrical short-circuit between the at least two power supply lines.

Next, the at least two power supply lines 510 and 520 are connected to a power terminal disposed in the lower portion of the rotary motor 500, and are pushed into the connection portion 120 along the inner surface of the body 110.

Continuously, the at least two power supply lines 510 and 520 pass one side of any one of the at least two spacing plates 121 and are bent to the other side.

Here, the bent portions of the at least two power supply lines 510 and 520 are stripped at a certain length, and then are seated on the at least two spacing plates 121 respectively.

Next, the power supply member 300 may be a PCB which is connected to a power supply (not shown) of the multicopter flying robot.

More specifically, the power supply member 300 is pushed into the connection portion 120 and includes at least two connecting parts 131 which contact the at least two power supply lines 510 and 520 respectively.

The at least two connecting parts 131 are spaced by a certain interval, preferably, by the spaced distance of the at least two power supply lines 510 and 520 seated in the connection portion 120.

Also, a combining groove 132 which is combined with spatial separation portion 122 is formed on one end of each of the at least two connecting parts 131.

Therefore, according to the motor bracket of the multicopter flying robot according to the embodiment of the present invention, the power supply line of the rotary motor, which is connected directly to a power driving unit of the multicopter flying robot, can be easily connected by using the power supply member having an attachable-detachable structure.

Also, when the multicopter flying robot takes off and lands, it is possible to obtain a structure capable of mitigating the impact with the ground and of reducing the vibration of the rotary motor, so that the multicopter flying robot is able to more stably take off and land.

As described above, while the specific embodiment of the present invention has been described in detail, various modifications and changes of the embodiment can be made without departing from the spirit and scope of the present invention. Therefore, the scope of the present invention should not be limited to the foregoing embodiment and should be defined by the following claims and equivalents thereto.

What is claimed is:

1. A motor bracket of a multicopter flying robot, the motor bracket comprising:
    a body receiving a rotary motor therein which is used in the multicopter flying robot;
    a connection portion which is formed on the outer surface of the body and receives at least two power supply lines connected to a power terminal of the rotary motor; and
    a power supply member which is pushed into the connection portion and electrically contacts the at least two power supply lines,
        wherein the connection portion comprises a spatial separation portion attaching to and detaching from the power supply member and forming at least two separated spaces.

2. The motor bracket of a multicopter flying robot of claim 1, wherein at least two spacing plates are spaced from each other within the connection portion.

3. The motor bracket of a multicopter flying robot of claim 2, wherein the at least two power supply lines are pushed into the connection portion along an inner surface of the body in order to prevent an electrical short-circuit, and then are bent to the at least two spacing plates respectively.

4. The motor bracket of a multicopter flying robot of claim 1, wherein the power supply member is a PCB which is connected to a power supply of the multicopter flying robot.

5. The motor bracket of a multicopter flying robot of claim 3, wherein the power supply member is pushed into the connection portion and comprises at least two connecting parts which contact the at least two power supply lines respectively, and wherein the at least two connecting parts are spaced from each other.

6. The motor bracket of a multicopter flying robot of claim 3, wherein the bent portions of the at least two power supply lines are stripped at a certain length, and then are seated on the at least two spacing plates respectively.

7. The motor bracket of a multicopter flying robot of claim 1, wherein the spatial separation portion has a structure which is divided into at least two branches depending on the use thereof.

8. The motor bracket of a multicopter flying robot of claim 4, wherein the power supply member is pushed into the connection portion and comprises at least two connecting parts which contact the at least two power supply lines respectively, and wherein the at least two connecting parts are spaced from each other.

* * * * *